(12) United States Patent
Sutton et al.

(10) Patent No.: US 10,451,207 B2
(45) Date of Patent: Oct. 22, 2019

(54) SAFETY SYSTEM

(71) Applicant: ANT HIRE SOLUTIONS LLP, Leeds (GB)

(72) Inventors: Ian Geoffrey Sutton, Ripon (GB); Alistair Nigel Thompson, Knaresborough (GB)

(73) Assignee: Ant Hire Solutions LLP, Leeds (GB)

( * ) Notice: Subject to any disclaimer, the term of this patent is extended or adjusted under 35 U.S.C. 154(b) by 48 days.

(21) Appl. No.: 15/555,001

(22) PCT Filed: Mar. 3, 2016

(86) PCT No.: PCT/GB2016/050556
§ 371 (c)(1),
(2) Date: Aug. 31, 2017

(87) PCT Pub. No.: WO2016/139478
PCT Pub. Date: Sep. 9, 2016

(65) Prior Publication Data
US 2018/0045356 A1 Feb. 15, 2018

(30) Foreign Application Priority Data

Mar. 3, 2015 (GB) .................................. 1503618.9

(51) Int. Cl.
F16L 55/134 (2006.01)
F16L 55/124 (2006.01)
(Continued)

(52) U.S. Cl.
CPC .............. *F16L 55/124* (2013.01); *F16K 7/10* (2013.01); *F16K 37/0025* (2013.01);
(Continued)

(58) Field of Classification Search
CPC ......... F16L 55/134; F16K 7/10; G08B 21/182
(Continued)

(56) References Cited

U.S. PATENT DOCUMENTS 3,691,819 A * 9/1972 Guest ..................... G01M 3/005
346/33 P
3,837,214 A * 9/1974 Guest ................... F16L 55/1283
73/40.5 R
(Continued)

FOREIGN PATENT DOCUMENTS

CN 101836172 A 9/2010
CN 203488917 U 3/2014
(Continued)

OTHER PUBLICATIONS

International Search Report and Written Opinion for corresponding PCT Application No. PCT/GB2016/050556, dated May 24, 2016 (16 pgs.).

(Continued)

*Primary Examiner* — Patrick F Brinson
(74) *Attorney, Agent, or Firm* — Shumaker & Sieffert, P.A.

(57) ABSTRACT

There is disclosed a safety system for stoppers and bungs. In particular, there is disclosed a stopper safety system for stoppers (50) for pipes (60). The stopper safety system includes a housing (30) configured for attachment to a stopper. The housing is adapted to hold a pressure sensor and a transmitter. The transmitter is positioned in the housing such that the transmitter abuts a first end of the stopper. The stopper safety system also includes a receiver (20) and a monitor (10). The transmitter is configured to wirelessly transmit a measured pressure from the pressure sensor to the receiver (20) and the monitor (10) and the monitor is configured to display the measured pressure.

18 Claims, 2 Drawing Sheets

(51) Int. Cl.
*F16K 7/10* (2006.01)
*F16K 37/00* (2006.01)
*G01L 19/08* (2006.01)
*G08B 21/18* (2006.01)

(52) U.S. Cl.
CPC ......... *F16L 55/134* (2013.01); *F16L 2201/20* (2013.01); *G01L 19/086* (2013.01); *G08B 21/182* (2013.01)

(58) Field of Classification Search
USPC .......... 138/93, 97, 89, 104; 73/40.5 R, 866.5
See application file for complete search history.

(56) References Cited

U.S. PATENT DOCUMENTS

| | | | | |
|---|---|---|---|---|
| 4,646,787 | A * | 3/1987 | Rush | G01M 3/005 |
| | | | | 104/138.2 |
| 5,029,614 | A | 7/1991 | Lara et al. | |
| 6,416,692 | B1 * | 7/2002 | Iwasaki-Higbee | F16L 55/164 |
| | | | | 138/97 |
| 7,432,495 | B2 * | 10/2008 | Baumann | B05B 5/0422 |
| | | | | 118/712 |
| 7,631,698 | B2 * | 12/2009 | Miller | E21B 23/01 |
| | | | | 166/255.1 |
| 7,980,136 | B2 * | 7/2011 | Ben-Mansour | G01M 3/22 |
| | | | | 73/40.5 A |
| 2005/0241710 | A1 * | 11/2005 | Early | F16L 55/1283 |
| | | | | 138/89 |
| 2005/0268977 | A1 | 12/2005 | Beaty | |
| 2014/0027000 | A1 * | 1/2014 | Kiest, Jr. | F16L 55/1653 |
| | | | | 138/97 |

FOREIGN PATENT DOCUMENTS

| | | |
|---|---|---|
| FR | 2444878 A1 | 7/1980 |
| GB | 2227805 A | 8/1990 |

OTHER PUBLICATIONS

Combined Search and Examination Report from counterpart United Kingdom application No. GB1503618.9, dated Mar. 17, 2015, 5 pp.
Office Action dated Nov. 22, 2018 for corresponding Chinese Application No. 2016800135824.1, 12 pgs.

* cited by examiner

SAFETY SYSTEM

This application is a national stage application under 35 U.S.C. § 371 of PCT Application No. PCT/GB2016/050556, filed Mar. 3, 2016, which claims the benefit of Great Britain Application No. 1503618.9, filed Mar. 3, 2015. The entire contents of each of PCT Application No. PCT/GB2016/050556 and Great Britain Application No. 1503618.9 are incorporated herein by reference in their respective entireties.

There is disclosed a safety system for stoppers and bungs. The system is well suited for use in large pipes, but is also suitable for all but very small pipe diameters. The safety system improves the safety of personnel working within pipelines where stoppers could be holding back large volumes of water and other materials by giving a reading of the pressure build-up behind the stopper or bung.

BACKGROUND

Stoppers, bungs and sealing cushions relate to devices for sealing pipes such as waste water pipes or sewer pipes. The devices range in size from a few centimeters in diameter to several meters in diameter to fit a range of different pipe sizes. The devices tend to be inflatable thereby providing ease of transportation, ease of installation, and further allow the device to shut off multiple pipe diameters. Some inflatable stoppers further provide the benefit of being able to shut off different pipe profiles such as egg-shaped, square or rectangular pipe cross sections. Stoppers, bungs and sealing cushions are used primarily to hold back fluid in a pipe in order to carry out maintenance, repairs and testing. They can be used to hold back a head of water either before or after an access point.

BRIEF SUMMARY OF THE DISCLOSURE

Viewed from a first aspect, there is provided a stopper safety system for a stopper to be installed in a pipeline via an opening in the pipeline, the stopper having a first end that is furthest away from the opening when installed and a second end that is closest to the opening when installed, the stopper safety system comprising:

a housing on an external portion of the first or second end of the stopper, the housing adapted to hold a pressure sensor and a transmitter, the transmitter being positioned in the housing such that the transmitter abuts the respective end of the stopper;

a receiver; and a monitor;

wherein the transmitter is configured wirelessly to transmit a measured pressure reading from the pressure sensor to the receiver, and wherein the monitor is configured to display the measured pressure.

Viewed from a second aspect, there is provided an inflatable stopper for installation in a pipeline via an opening in the pipeline, the stopper having a first end that is furthest away from the opening when installed and a second end that is closest to the opening when installed, the stopper comprising:

a housing configured to adhere to an external portion of the first or second end of the stopper, the housing adapted to hold a pressure sensor and a transmitter, the transmitter being positioned in the housing such that the transmitter abuts the respective end of the stopper;

wherein the transmitter is configured wirelessly to transmit a measured pressure reading from the pressure sensor to a receiver.

The stopper system and stopper are particularly well suited for buried pipelines such as sewage pipes or water pipes. The stopper may be installed via an access shaft, or directly into an opening in the pipeline where ground conditions permit. A benefit of the stopper safety system is that the stopper safety system allows pressure changes behind the stopper to be monitored, with a warning system to alert a user when the pressure reaches an unacceptable level. Stoppers are used to hold back flow within the pipe to enable personnel to carry out work in the pipeline. An increased pressure could result in stopper failure or flooding. Early detection of an unacceptable pressure level allows preventative measures to be taken to prevent stopper failure or flooding, and allows personnel to evacuate the pipeline prior to stopper failure.

A particular problem that is addressed by embodiments of the present invention is that low-powered transmitters are unable to transmit signals through water, but only through air. Embodiments of the present invention therefore seek to reduce or eliminate the presence of water between the transmitter and the receiver when the system has been installed in a pipeline and is being used to hold back a head of water.

Optionally, the housing is formed from a material similar or identical to that of the stopper. The housing may be attached to the outer surface of the stopper, or may be integral to the outer surface of the stopper.

Optionally, at least one layer of a closed-cell foam material is provided between the transmitter and a wall of the stopper within the housing. The at least one layer of a closed-cell foam material is arranged so as to prevent or hinder ingress of water or other fluid between the transmitter and the wall of the stopper within the housing. The at least one layer of closed-cell foam material may closely abut the transmitter on one side, and the wall of the stopper on the other side. This helps to maximise transmission efficiency between the transmitter and the receiver.

Optionally, the transmitter is embedded within the housing.

Optionally, the housing is provided with a number of holes to allow water into the housing.

The monitor may be configured to provide a warning when a reduction or an increase in the measured pressure is detected.

Optionally, the monitor is configured to provide a warning when a reduction or an increase in the measured pressure is detected, or more preferably, provide a warning when the measured pressure increases above a predetermined threshold pressure.

Optionally, the system is further provided with an inflation device configured to connect compressed air through a controller to the stopper and inflate the stopper.

Optionally, the system is further provided with a monitor, the monitor configured to monitor the measured pressure from the receiver and communicate the measured pressure to the monitor, and optionally, wherein the monitor is further provided with an airline in communication with the controller, configured to measure the air pressure in the stopper.

The housing, pressure sensor and transmitter are located at an end of the stopper that faces a volume of water or other fluid that is being held back by the stopper. The connector for attachment to the airline is located at the second end of the stopper that is closest to the access shaft when the stopper is installed. The volume of water or other fluid that is being held back may be located at either the first end or the second end of the stopper, depending on operational requirements.

Optionally, the receiver is provided with a transmission cable, wherein the transmission cable enables the receiver to be located in the access shaft or opening and connected to the monitor which may be located above ground. This arrangement is useful when the volume of water that is being held back by the stopper is at the first end of the stopper.

Optionally, the receiver and the transmission cable may be incorporated in an airline that is connected to the connector for inflating the stopper. The receiver may, when the airline is attached to the connector, be located at the second end of the stopper. Preferably, the receiver protrudes into or is in communication with the interior of the stopper at the second end thereof. This is particularly advantageous then the second end of the stopper is holding back the volume of water, since the transmitter can communicate with the receiver through the air inside the stopper, even when the access shaft is filled with water.

In some embodiments, the receiver may be located at ground level, outside the access shaft or opening, for example together with the monitor. Because the signals from the transmitter will tend to be attenuated quite strongly by the ground, a separate antenna module may be provided. The antenna module may be connected to the receiver, for example by way of a cable, and the antenna module may be lowered down the access shaft or into the opening so as to allow it to receive signals transmitted from the transmitter. This arrangement has a number of safety advantages, since the antenna module will generally be free from switches and other electrical components that might generate sparks which could be dangerous in the presence of explosive gases in the pipeline. This allows a receiver to be used at ground level. In addition, should the pipeline and/or the access shaft accidentally flood, the antenna module is less prone to damage than the receiver.

Optionally, an inflation device and an inflation line for connecting to the stopper and for inflating the stopper is provided, the inflation line providing a flow of material to inflate the stopper, the controller being configured to control the inflation device.

In some embodiments, first and second housings may be provided, one at each of the first and second ends of the stopper. A pressure sensor and transmitter may be provided in each housing, or a single pressure sensor and transmitter may be relocatable between the first and second housings. The pressure sensors and transmitters may be selectively activatable so that the same stopper can be used for holding back water or other fluid on either the first side or the second side, depending on operational requirements.

Optionally, the stopper body is formed from an elastomeric material. The body may be formed from synthetic or natural rubber. The body may be coated in a protective material. The protective material may be neoprene or a composite plastic material. The body may be coated in neoprene.

Optionally, the body is formed from reinforced neoprene.

BRIEF DESCRIPTION OF THE DRAWINGS

Embodiments of the invention are further described hereinafter with reference to the accompanying drawings, in which.

DETAILED DESCRIPTION

Figure 1:
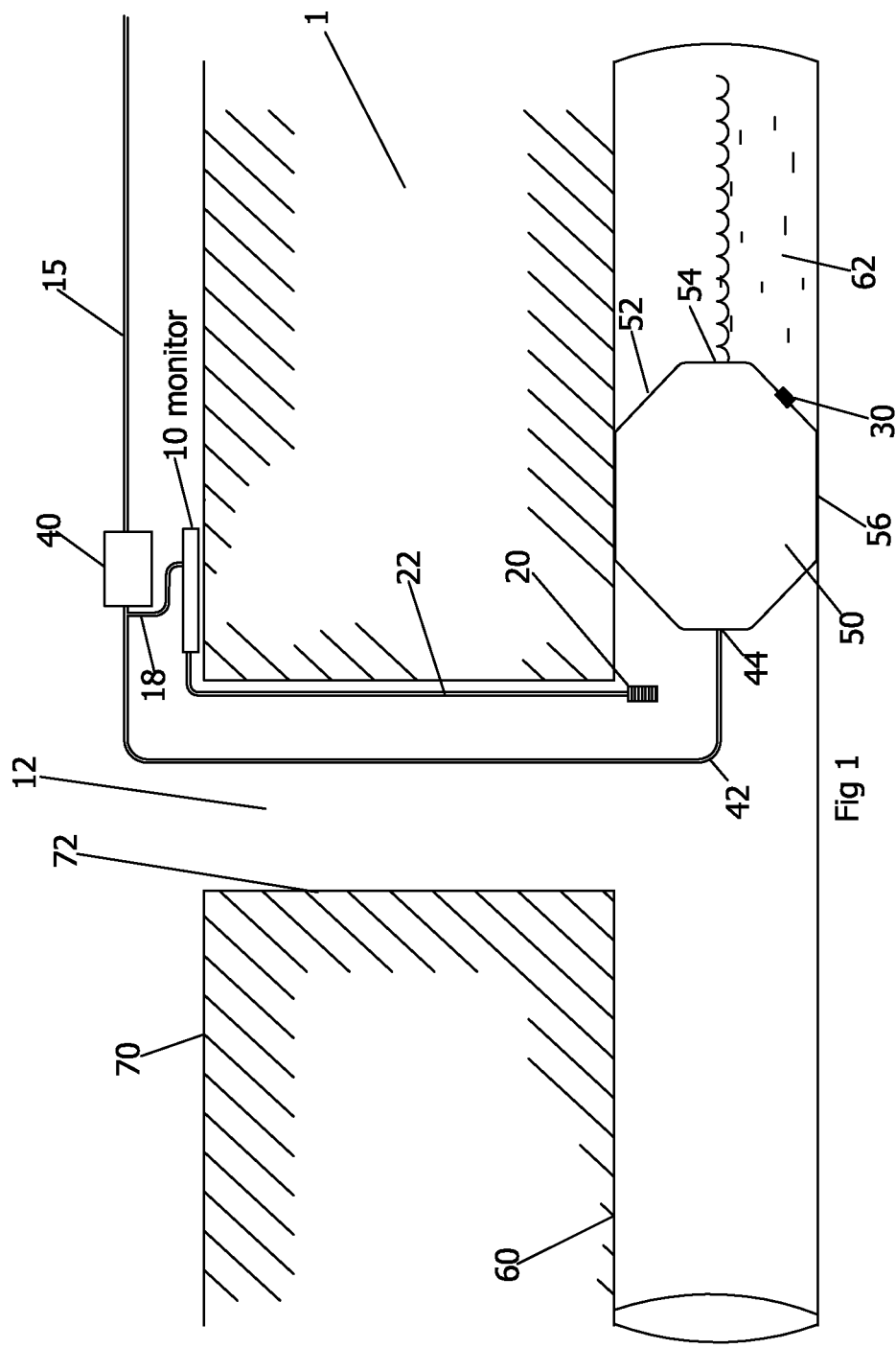
FIG. 1 shows a first embodiment of the present invention installed in a pipeline through an access shaft.

FIG. 1 shows an example of a stopper safety system 1. The stopper safety system 1 includes a housing 30 incorporating a pressure sensor and a transmitter. Other sensors may also be incorporated into the housing.

At least a portion of the housing 30 is made from closed cell neoprene and the closed cell neoprene portion of the housing 30 is attached directly to a stopper 50. The housing is attached using an adhesive. The housing is attached to the stopper 50 at one end of the stopper 50. In one example, the stopper has a bevelled end 52 and the housing 30 is positioned between a centre 54 of the bevelled end 52 and a sealing wall 56 of the stopper. The position is chosen to reduce any damage caused to the housing when installing the stopper 50 in a pipe 60 through an access shaft 12. The housing 30 is formed from resilient material in order to protect the pressure sensor and a transmitter housed in the housing. The access shaft 12 has a wall portion 72.

The transmitter is located in the housing so that the transmitter is closest to the surface of the stopper when the stopper is installed. This position maximises the ability of the transmitter to transmit measurements from the pressure sensor to a receiver 20 located at the other end of the stopper. The Applicants have identified that by locating the transmitter on the closed cell neoprene portion of the housing and by arranging the housing so that the closed cell neoprene portion abuts the stopper, the signal transmitted by the transmitter is able to reach the receiver. The transmitter is specially adapted for use in underground environments where there is a risk of gases being released into the environment. As such, the transmitter must be a low voltage device meeting the required safety regulations for a device being used underground. The transmitter and receiver may communicate by radio frequency signals.

The transmitter is configured to wirelessly transmit a measured pressure from the pressure sensor to a receiver 20 which in turn sends communicates with a monitor 10.

The pressure sensor measures the pressure of water or fluid held behind the stopper. The pressure sensor and transmitter may be powered by an internal battery. The pressure levels that can be monitored depend on the sensitivity of the pressure sensor, which will typically allow a head of water in a range from 0 to 10 m (1 bar) to be measured.

The stopper safety system 1 also includes a receiver 20, a monitor 10 and a controller 40. The receiver comprises an antenna configured to detect the signal transmitted by the transmitter. The receiver thereby receives the measured pressure from the pressure sensor and communicates this to the monitor 10. The receiver 20 may be powered by an internal battery. In preferred embodiments, the maximum transmission range is around 50 m through air. However, the transmitted signal is severely attenuated by water.

The receiver 20 is provided with a transmission cable 22. The transmission cable 22 enables the receiver 20 to be suspended or positioned in the access shaft 12 or the pipeline 60 and connects the receiver 20 to the monitor 10. Only by positioning the receiver 20 down the access shaft 12 in a direct line of sight with the transmitter is it possible to obtain a reliable link with the transmitter, since the transmitted signal travels in a straight line and would not reliably reach a receiver located at ground level 70.

Alternatively, the receiver 20 may be located above ground 70 with the controller 40 and the monitor 10. In this case, a separate antenna module may be connected to the receiver 20 and lowered down the access shaft 12 until the antenna module is in a direct line of sight with the transmitter.

Improvements to transmitters and receivers 20 may enable transmission of information even without direct line of sight. There is a balance between the amount of power allowed in devices used in pipelines, and the power of the transmitter receivers 20.

The monitor 10 includes a warning system. If the pressure of the water or fluid held behind the stopper drops below or increases above a predetermined pressure, a warning is provided. A drop in pressure can indicate a leak in the pipe. An increase in pressure may indicate an increased risk of the stopper dislodging.

The controller 40 may also include an integral air supply, an integral pump or an integral compressor. The air supply, pump or compressor is used to inflate or deflate the stopper.

A monitor 10 is provided for monitoring the pressure received by the receiver 20 from the pressure sensor in the housing 30. The monitor 10 thereby has the capability to measure the pressure in the pipe, i.e. the pressure of water or other flowing material being held back by the stopper. The monitor 10 is provided with an airline 18 to the controller 40. The monitor can therefore measure the pressure in the airline, this being equivalent to the air pressure inside the stopper 50.

In the example of a water pipe, the water held behind the stopper is known as the head of water. It is the head of water that creates a pressure on the stopper 50 in the pipeline.

The monitor 10 may also be provided with means for measuring the air pressure inside the stopper 50. This is achieved by providing an airline 18 between the inflation hose 42 end of the controller 40 and the monitor. The monitor is then able to detect the pressure in the stopper 50. Any changes in the stopper air pressures are thereby fed back to the monitor 10.

If the pressure behind the stopper 50 and inside the stopper 50 is measured, these measured values can be compared with predetermined thresholds to enable the stopper to be used more safely.

Predetermined thresholds can be calculated for each pipe diameter and each stopper 50. A particular stopper 50 will have a range of pressures it can withstand while effectively maintaining a seal on the inside of the pipe 60. Without being bound by mathematical theory, the maximum pressure the stopper can withhold while staying in place in the pipe 60 is proportional to the air pressure within the stopper 50, the size of the stopper 50 and the internal dimensions of the pipe 60.

It is advantageous to know the maximum pressure that can be applied to the stopper 50 inflated to a first stopper threshold pressure while in position in the pipe 60. The monitor 10 displays the measured pressure from the pressure sensor in the housing 30 and also the air pressure in the stopper 50. The monitor is configured to compare and display the differential pressure between the sensor in the housing 30 and the air pressure in the stopper 50. It is important, in certain embodiments, to ensure that this differential pressure is less than the pressure in the stopper 50, advantageously by a minimum ratio of two to one, so as to allow a safety margin for preventing the stopper 50 from becoming dislodged in the pipe 60 and failing.

If the measured pressure increases such that it approaches the maximum pressure the monitor 10 sends a warning to the user.

The warning can be a buzzer or a light. Additionally or alternatively, the monitor 10 is further provided with communication means and is able to communicate a warning to the user, for example by sending a warning in an SMS message, or an email to the user.

Instead of the warning being triggered upon the pressure behind the stopper reaching a maximum pressure, a number of warnings may be triggered as an increase or a decrease in the pressure behind the stopper 50 is detected.

As mentioned above, there is a maximum pressure that can be exerted on a stopper 50 when the stopper 50 is inflated to a first threshold pressure. If the stopper pressure is reduced to a second threshold pressure that is lower than the first threshold, water held behind the stopper can seep between the inner wall of the pipe and the outer surface of the stopper 50 at the bottom. The water will flow underneath the stopper. This initial flow of water reduces the pressure behind the stopper, and if the second threshold pressure is maintained in the stopper 50, the stopper 50 is retained in the pipe, avoiding a blow out and avoiding danger to people working in the pipeline. A further advantage is that the second threshold pressure reduces the risk of the stopper dislodging in the pipe and becoming damaged by being drag through the pipe. The monitor is provided with a touch display. The touch display allows the user to set a high water level alarm set point which is a maximum pressure of water that the stopper 50 can hold in the pipeline without the stopper failing. The water level alarm set point can be a measure of the head of water held behind the stopper 50 and can be set between 0 meters and 10 meters. This is just an example of an appropriate range for a particular pipe diameter. Other ranges for other pipe diameters may also be appropriate. The default high water level alarm set point is 5 m.

When the high water level alarm is activated, the user may override the alarm by pressing a button displayed on the display. The display shows the water pressure in meters that has built up behind the stopper 50. The display also shows the air pressure in bar inside the stopper 50. The monitor 10 calculates a differential pressure in bar and displays the differential pressure. The differential pressure is the differential between the water pressure in the pipe behind the stopper 50 and the pressure in the stopper 50.

If the water behind the stopper provides a greater pressure to the stopper 50 than the internal pressure in the cushion, water will begin to flow underneath the stopper, safely releasing some of the pressure behind the stopper 50 and thus giving personnel working behind the stopper a warning to vacate the area immediately.

When removing the stopper 50 from a pipe 60, it is important to allow the air pressure in the stopper 50 to discharge naturally and be balanced against the pressure on the stopper from the head of fluid behind the stopper. This can be done by using the controller which can in turn activate a release valve to release air from the stopper 50. By providing a variable release valve, the stopper 50 can be deflated in a controlled and regulated manner by controlling the flow of air coming out of the release valve. Care has to be taken to ensure that back pressure from the fluid held back in the pipe, is completely released in order to safely deflate the stopper 50.

Having a measure of the differential pressure is extremely useful when removing the stopper from a pipeline. The differential can be used by the user to lower the pressure inside the stopper and release the water pressure behind the stopper in a controlled manner. The stopper is thereby kept in position in the pipeline, reducing the risk of the stopper becoming dislodged and becoming damaged by the inner walls of the pipe.

The above described arrangement provides a safe and efficient way of installing a stopper safety system with a stopper 50 to measure the pressure in the pipe 60 at one side of the stopper 50. The safety stopper system reduces the time required to install and remove the stopper 50 and it provides an effective means for reliably measuring the pressure in the pipe 60 because the position and location of the pressure sensor are predetermined.

In one example, the warning system includes an alarm such as a buzzer or flashing light. In another example, the warning system may include more sophistic functionality including an automated messaging system.

In one example, the transmitter is embedded within the housing 30 so as to maximise transmission efficiency between the transmitter and receiver. By limiting the amount of material through which the transmitter must transmit in order for the signal to reach the receiver, the stopper safety system 1 is able to operate reliably.

In another example, the housing 30 is provided with a number of holes to allow water or fluid into the housing 30. The housing 30 is configured so as to ensure the pressure sensor and transmitter are protected from harm during installation of the stopper 50 in the pipe 60.

In another example, a stopper is provided with a housing 30 at the first end of the stopper and/or at the second end of the stopper. In this way, water pressure may be monitored at either end of the stopper.

In another example, a housing 30 is provided at one or both ends of the stopper 50 and a connector 44 is provided on the end of the stopper that is closest to the access shaft 12 when installed. The connector 44 allows an airline 42 to be attached, thereby allowing the stopper 50 to be inflated by way of the controller 40 via an air compressor or other means of inflating the stopper 15. The compressed air supply 15 may be from a mechanical air compressor or compressed air cylinders.

Figure 2:
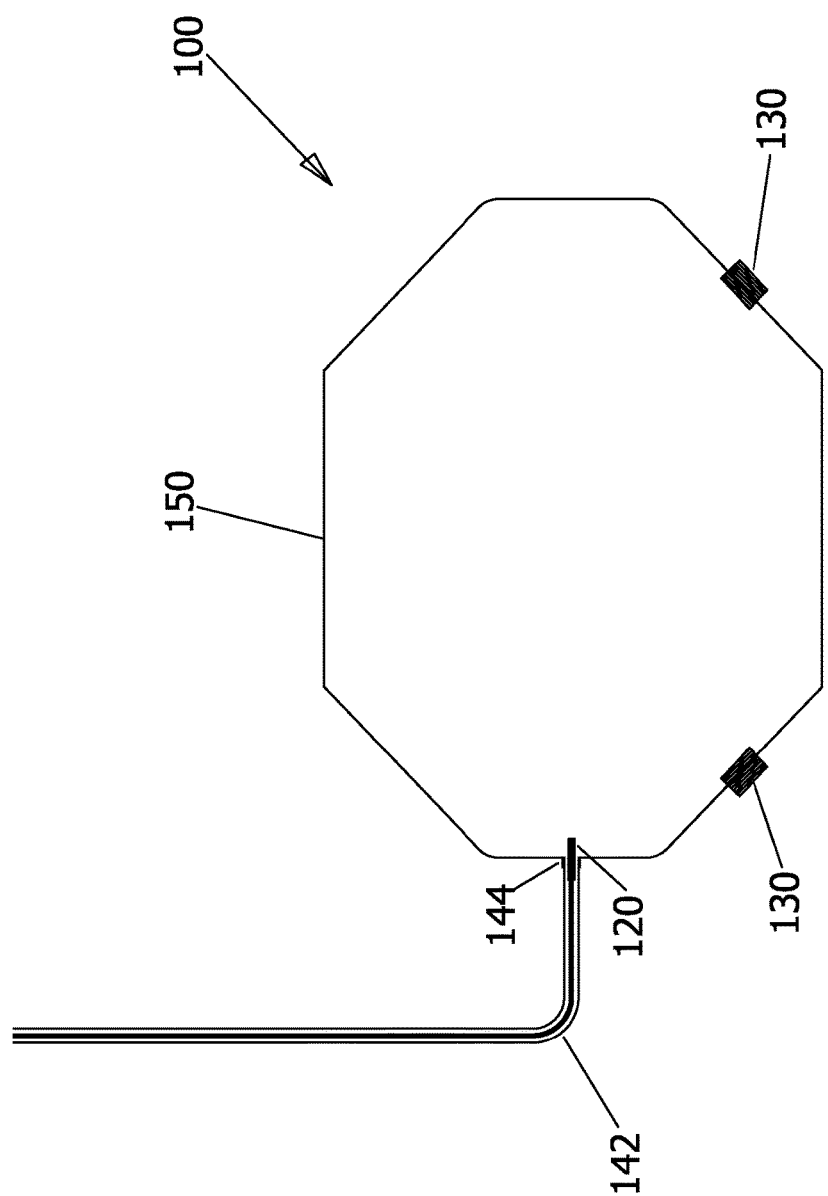
FIG. 2 shows an alternative embodiment.

In the embodiment shown in FIG. 2, an airline 142 incorporates a receiver or an antenna module 120. When the airline 142 is attached to the connector 144, the receiver or antenna module 120 protrudes into the interior of the stopper 150. This is of particular benefit when the end of the stopper 150 with the connector 144 is submerged in water, since the receiver or antenna module 120 will still have a direct line of sight through air to the transmitter. The embodiment of FIG. 2 has two housings 130 for housing the transmitter and pressure sensor, so that the stopper 150 can be used for holding back water from either end. It will be understood that, when using an antenna module 120 in the airline 142, the antenna module 120 will be connected to a receiver located elsewhere, for example at ground level 70.

The stoppers 50, 150 are typically made from reinforced neoprene. This material is very robust and strong and is able to form a good seal with the inner wall of the pipe 60, 160.

In an example, there may be a stopper safety system for a stopper to be installed in a pipeline via an access shaft, the stopper having a first end that is furthest away from the access shaft when installed and a second end that is closest to the access shaft when installed, the stopper safety system comprising: a connector at the second end of the stopper for attachment to an airline for inflating the stopper; a housing on an external portion of the first or second end of the stopper, the housing adapted to hold a pressure sensor and a transmitter, the transmitter being positioned in the housing such that the transmitter abuts the respective end of the stopper; a receiver; and a monitor; wherein the transmitter is configured to wirelessly transmit a measured pressure reading from the pressure sensor to the receiver, and wherein the monitor is configured to display the measured pressure.

In another example of a stopper safety system, the housing is formed from a closed cell material.

In another example of a stopper safety system, the transmitter is embedded within the housing.

In another example of a stopper safety system, the housing is provided with a number of holes to allow water into the housing.

In another example of a stopper safety system, at least one layer of a closed-cell foam material is provided between the transmitter and a wall of the stopper within the housing.

In another example of a stopper safety system, the at least one layer of a closed-cell foam material is arranged so as to prevent or hinder ingress of water or other fluid between the transmitter and the wall of the stopper within the housing.

In another example of a stopper safety system, the at least one layer of closed-cell foam material closely abuts the transmitter on one side, and the wall of the stopper on the other side.

In another example of a stopper safety system, the receiver is provided with a transmission cable connected to the controller.

In another example of a stopper safety system, the receiver and the transmission cable are incorporated in the airline.

In another example of a stopper safety system, the receiver is located at the second end of the stopper when the airline is attached to the connector.

In another example of a stopper safety system, the receiver protrudes into or is in communication with an interior of the stopper at the second end thereof.

In another example of a stopper safety system, first and second housings are provided, one at each of the first and second ends of the stopper.

In another example of a stopper safety system, a pressure sensor and transmitter is provided in each housing.

In another example of a stopper safety system, the monitor is configured to provide a warning when a reduction or an increase in the measured pressure is detected.

In an example, there may be an inflatable stopper for installation in a pipeline via an access shaft, the stopper having a first end that is furthest away from the access shaft when installed and a second end that is closest to the access shaft when installed, the stopper comprising: a connector at the second end of the stopper for attachment to an airline for inflating the stopper; a housing on an external portion of the first or second end of the stopper, the housing adapted to hold a pressure sensor and a transmitter, the transmitter being positioned in the housing such that the transmitter abuts the respective end of the stopper; wherein the transmitter is configured to wirelessly transmit a measured pressure reading from the pressure sensor to a receiver.

In another example of an inflatable stopper, the housing is formed from a closed cell material.

In another example of an inflatable stopper, the transmitter is embedded within the housing.

In another example of an inflatable stopper, the housing is provided with a number of holes to allow water into the housing.

In another example of an inflatable stopper, at least one layer of a closed-cell foam material is provided between the transmitter and a wall of the stopper within the housing.

In another example of an inflatable stopper, the at least one layer of a closed-cell foam material is arranged so as to prevent or hinder ingress of water or other fluid between the transmitter and the wall of the stopper within the housing.

In another example of an inflatable stopper, the at least one layer of closed-cell foam material closely abuts the transmitter on one side, and the wall of the stopper on the other side.

It will be clear to a person skilled in the art that features described in relation to any of the embodiments described above can be applicable interchangeably between the different embodiments. The embodiments described above are examples to illustrate various features of the invention Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments.

The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A stopper safety system for a stopper to be installed in a pipeline via an opening in the pipeline, the stopper having a first end that is furthest away from the opening when installed and a second end that is closest to the opening when installed, the stopper safety system comprising:
   a housing configured to adhere to an external portion of the first or second end of the stopper, the housing adapted to hold a pressure sensor and a transmitter, the transmitter being positioned in the housing such that the transmitter abuts the respective end of the stopper;
   a receiver;
   a monitor;
   an antenna module connected to the receiver, wherein the antenna module is configured to be lowered towards or into the opening so as to allow direct line of sight communication with the transmitter through the stopper, the receiver being located away from the pipeline; and
   an inflation device and an inflation line for connecting to the stopper and for inflating the stopper, the inflation line providing a flow of material to inflate the stopper, wherein the transmitter is configured to wirelessly transmit a measured pressure reading from the pressure sensor to the receiver, wherein the monitor is configured to display the measured pressure, and wherein the antenna module is incorporated into the inflation line.

2. The system as claimed in claim 1, wherein the receiver is configured to be lowered towards or into the opening so as to allow direct line of sight communication with the transmitter through the stopper.

3. The system as claimed in claim 1, wherein the housing is formed from a closed cell material.

4. The system as claimed in claim 1, wherein the transmitter is embedded within the housing.

5. The system as claimed in claim 1, wherein the housing is provided with a number of holes to allow water into the housing.

6. The system as claimed in claim 1, wherein at least one layer of a closed-cell foam material is provided between the transmitter and a wall of the stopper within the housing.

7. The system as claimed in claim 6, wherein the at least one layer of a closed-cell foam material is arranged so as to prevent or hinder ingress of water or other fluid between the transmitter and the wall of the stopper within the housing.

8. The system as claimed in claim 7, wherein the at least one layer of closed-cell foam material closely abuts the transmitter on one side, and the wall of the stopper on the other side.

9. The system as claimed in claim 1, wherein the receiver is incorporated into the inflation line.

10. The system as claimed in claim 9, wherein the receiver is located at the second end of the stopper when the inflation line is attached to the stopper.

11. The system as claimed in claim 10, wherein the receiver protrudes into or is in communication with an interior of the stopper at the second end thereof.

12. The system as claimed in claim 1, wherein the antenna module is located at the second end of the stopper when the inflation line is attached to the stopper.

13. The system as claimed in claim 12, wherein the antenna module protrudes into or is in communication with an interior of the stopper at the second end thereof.

14. The system as claimed claim 1, wherein first and second housings are provided, one at each of the first and second ends of the stopper.

15. The system as claimed in claim 14, wherein a pressure sensor and transmitter is provided in each housing.

16. The system as claimed claim 1, wherein the monitor is configured to provide a warning when a change in the measured pressure is detected, optionally to provide a warning when a reduction or an increase in the measured pressure is detected, optionally to provide a warning when the measured pressure increases above a predetermined threshold pressure.

17. The system as claimed claim 1, wherein the inflation device is configured to connect to the stopper and inflate the stopper.

18. The system as claimed claim 1, wherein the monitor is configured to monitor the measured pressure from the receiver and communicate the measured pressure to the monitor, and optionally, wherein the monitor is further provided with an airline configured to measure the air pressure in the stopper.

* * * * *